March 15, 1960 H. W. TREVASKIS 2,928,122
APPARATUS FOR CONTINUOUSLY COATING A CORD WITH
RUBBER OR OTHER THERMOPLASTIC MATERIAL
Filed June 6, 1956 3 Sheets-Sheet 1

INVENTOR.
HENRY WILLIAM TREVASKIS
BY
ATTORNEY

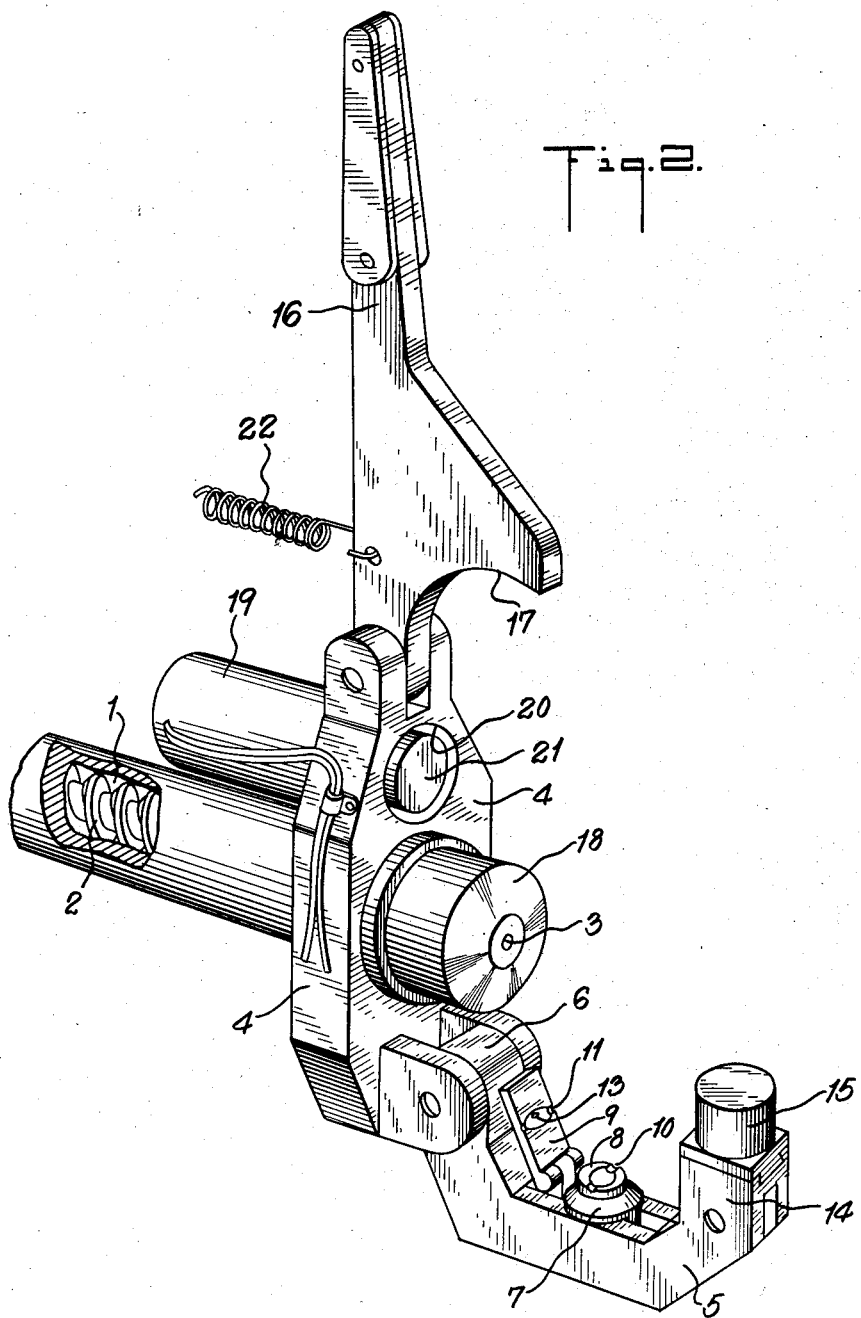

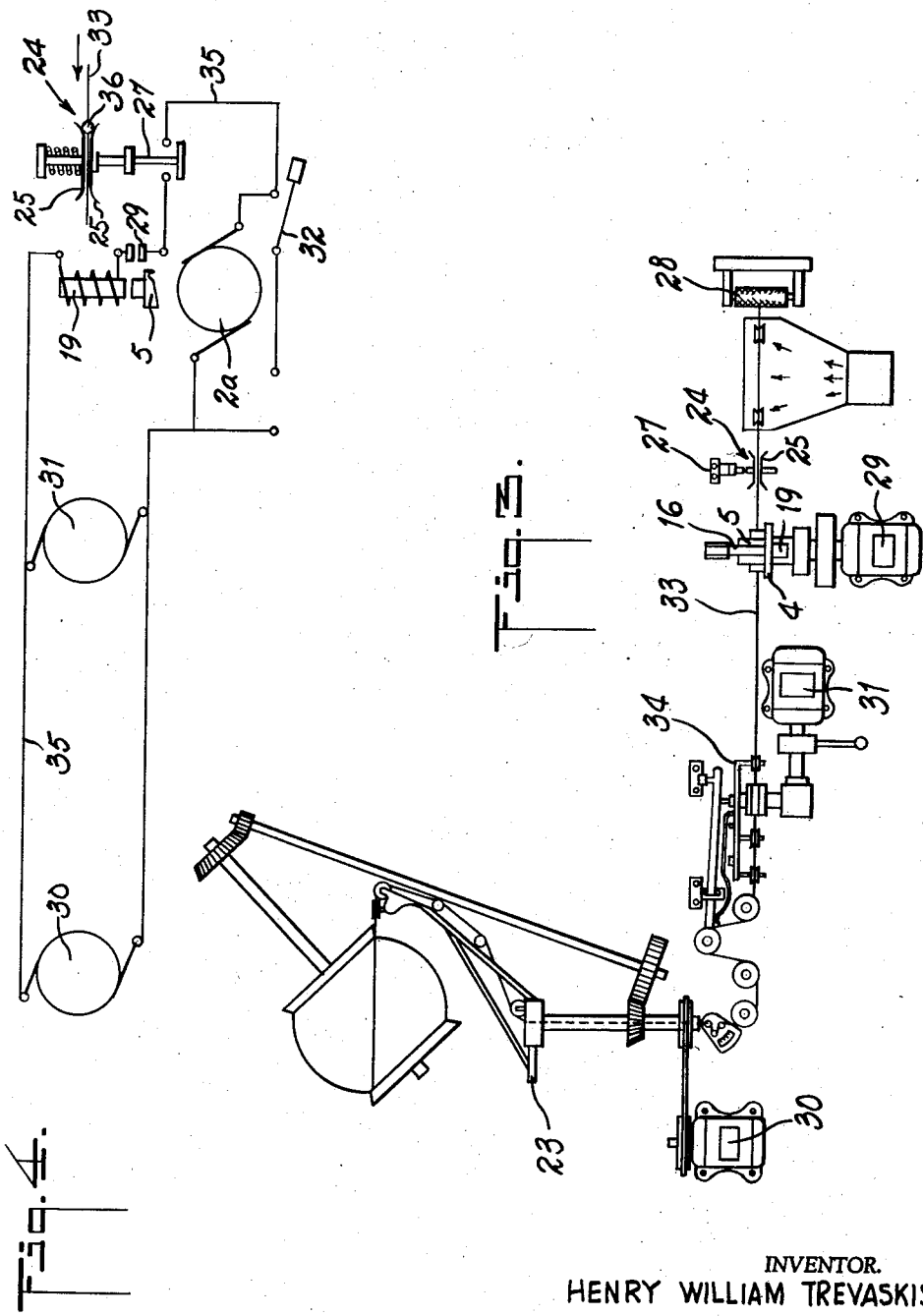

United States Patent Office 2,928,122
Patented Mar. 15, 1960

2,928,122

APPARATUS FOR CONTINUOUSLY COATING A CORD WITH RUBBER OR OTHER THERMOPLASTIC MATERIAL

Henry William Trevaskis, Solihull, England, assignor to Dunlop Tire and Rubber Corporation, Buffalo, N.Y., a corporation of New York Application June 6, 1956, Serial No. 589,622

16 Claims. (Cl. 18—13)

My invention relates to apparatus for continuously extruding rubber or other thermoplastic material around a cord as it is wound off a bobbin or other package.

In my co-pending application Ser. No. 491,295 filed March 1, 1955 a method of constructing a reinforcement for a pneumatic tire is described comprising winding a long length of rubber coated cord continuously around a rotating former. The cord is drawn off a bobbin and passes through an extruding apparatus which covers the cord with a thin coating of unvulcanized rubber. The rubber covered cord then passes through a clutch mechanism and thence to a rotating arm of the winding apparatus. The function of the clutch mechanism is to draw the cord off the bobbin and through the extruding apparatus and at the same time to regulate the tension in the cord between the clutch mechanism and the winding apparatus to a predetermined value.

The extruding apparatus comprises a chamber having a screw conveyor rotatable therein. Unvulcanized rubber is fed into one end of the chamber and is forced by the screw conveyor into contact with the cord passing transversely through the other end of the chamber and out of an orifice having a diameter slightly greater than that of the cord so that the cord is covered with an even coating of rubber of known thickness.

It has been found, however, that snags and knots in the cord are unable to pass through the orifice of the extruder and if not detected in time will jam in the extruder chamber and break the cord.

My present invention provides apparatus whereby this disadvantage is overcome.

According to my present invention apparatus to extrude rubber or other thermoplastic material evenly around a cord or the like comprises an extrusion chamber, means to extrude the thermoplastic material through an orifice at one end of said chamber, an angularly movable arm, two members associated with said arm and forming in combination a passage for said cord, a conduit through one of said members communicating at one end with said cord passage and means to retain the arm in a position where said members are held tightly between the arm and said end of the chamber, the other end of said conduit communicating with the extrusion chamber orifice.

The arm is preferably adapted to drop downwardly when the clamping means are released and the two members have abutting faces grooved so that together they form a cord passage and can be parted to allow the insertion or removal of the cord, or allow knots or snags in the cord to be moved from one side of the passage to the other.

The winding apparatus is preferably driven by an electric motor and a switch is operated automatically on clamping the arm in position to complete the circuit and start the main drive. Preferably also an electro-magnet, also wired into the main circuit, is associated with the arm to hold it in position when the circuit is closed and when the clamping means are removed. In this case the cord is led from the bobbin and through a knot or snag detector, which, on encountering a knot or snag in the cord operates a micro-switch to break the main drive circuit. This stops the motor of the winding apparatus and at the same time de-energizes the electro-magnet to allow the arm to drop automatically so that the knot or snag in the cord may be moved manually to the other side of the extruder.

Such apparatus is more fully described in the above-mentioned co-pending application.

My invention will now be described with reference to the accompanying drawings in which Fig. 1 is a perspective view of an apparatus in accordance with the invention as it appears in operative position and with the clamp in process of being released;

Fig. 2 is a similar view of the apparatus opened up in readiness for the positioning of a cord.

Fig. 3 is a diagrammatic view of winding apparatus according to the invention, and Fig. 4 is an electrical circuit diagram of the apparatus of Fig. 3.

Figure 1:
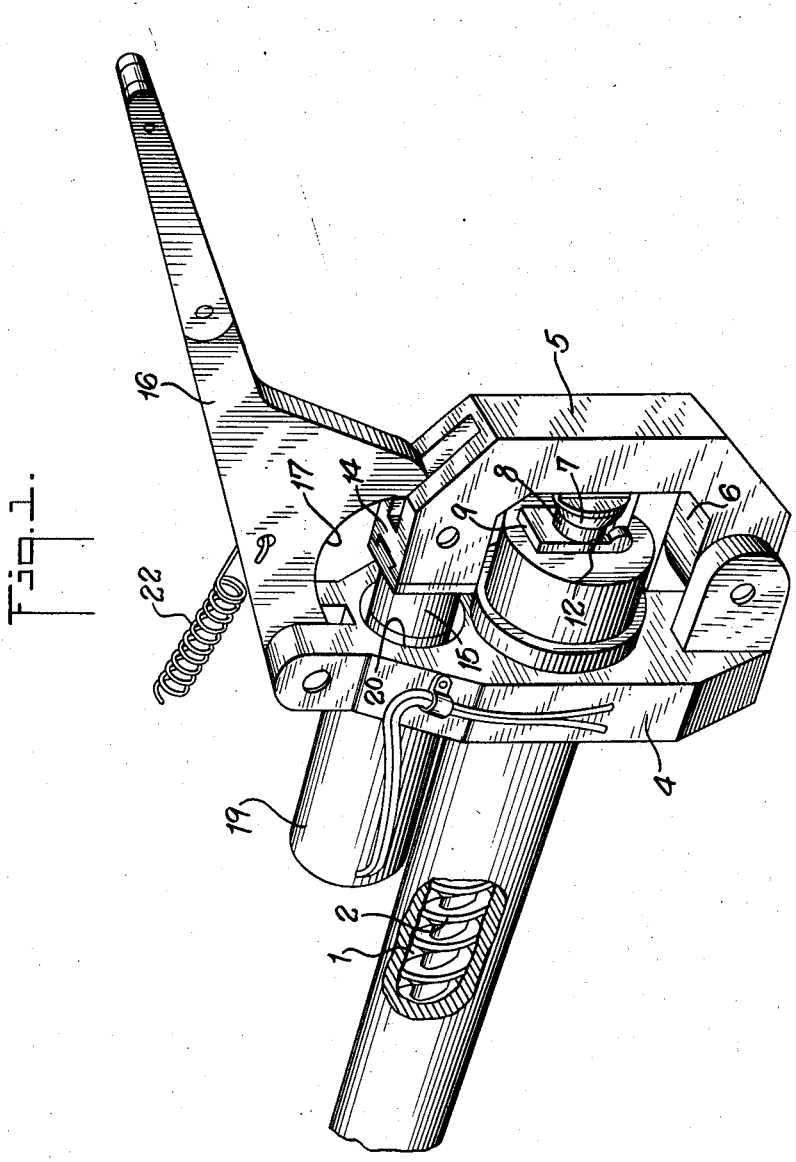

The apparatus comprises a chamber 1 having a screw conveyor 2 rotatable therein by an electric motor 29 (Fig. 3). A ribbon of unvulcanized rubber stock (not shown) is fed continually into one end of the chamber and is extruded through an outlet orifice 3 at the other end of the chamber.

A bracket 4 is secured to the chamber 1 adjacent its outlet end and a cranked arm 5 has one end 6 pivotally secured to the lower side of the bracket 4 and is adapted to swing vertically in a plane containing the axis of the chamber outlet 3. Secured to the arm 5 and intermediate the ends thereof is a frusto-conical member 7, the smaller diameter end 8 thereof being presented away from the arm, and a flat plate 9 is provided having a portion abutting the smaller diameter end of the frusto-conical member 7 and having one end pivotally attached to the arm 5. A spring (not shown) is provided to lightly urge the plate 9 against the frusto-conical member 7. The smaller diameter end 8 of the frusto-conical member 7 and the adjacent face of the flat plate 9 are provided with complementary grooves 10, 11, which together form a passage 12 of predetermined diameter through which the cord 33 (Fig. 3) passes on its way from a bobbin 28 to the clutch mechanism 34 of the winding apparatus 23. The groove 11 in the plate 9 is connected with a conduit 13 extending through the plate.

The end 14 of the arm 5 remote from the pivoting end 6 is provided with a boss 15 extending normally to the plane of the arm. Pivotally secured to the bracket 4 encircling the extrusion chamber 1, and at a location diametrically opposed to the pivotal end of said arm 5, is a lever 16 having a cam surface 17 incorporated therein adapted to engage the arm 5 behind the boss 15.

The arrangement of parts is such that on swinging the arm 5 upwardly the flat plate 9 abuts the outlet orifice end 18 of the extrusion chamber 1, the conduit 13 through the plate 9 being then axially aligned with the outlet orifice 3. The lever 16 is then engaged behind the boss 15 and angularly moved to clamp the said orifice end 18 of the chamber, the flat plate 9 and the frusto-conical member 7 tightly together, and thus prevent leakage of rubber. On moving the cammed lever 16 in the opposite direction, i.e. unclamping the arm 5, the arm swings downwardly under its own weight to expose the outlet orifice 3.

When the arm 5 is in its downward or disengaged position the cord may be inserted in the cord passage 12 between the plate 9 and the frusto-conical member 7 by moving the flat plate 9 against its spring for a distance sufficient to permit such insertion. The arm 5 is then swung upwardly and clamped in position by means of the cammed lever 16 and rubber, extruded through the outlet orifice 3 by the screw conveyor 2, is forced through the conduit 13 in the flat plate 9 and into the cord passage 12 where it evenly coats the cord 23 passing therethrough.

If a knot or snag in the cord 33 is detected the winding apparatus 23 (Fig. 3) may be stopped, the extruder arm 5 unclamped to allow it to pivot downwardly and the plate 9 moved against its spring to enable the knot or snag to be manually passed to the other side of the cord passage 12. The arm 5 is then re-engaged and clamped and the winding apparatus started again.

The outlet end 18 of the extrusion chamber 1 may be provided with heating means, e.g. an electrical resistance heater, to heat the rubber on commencing a winding operation, and to render it more plastic and thus ensure more even distribution on the cord. The extruder itself, however, generates considerable heat, so that after a short interval of time it is necessary to switch off the heater, and in fact it may be found necessary to provide means to dissipate the generated heat, by means of, e.g. fins (not shown) on the extrusion chamber.

It is inadvisable to stop the screw conveyor 2 of the extruder when the winding apparatus 23 is stopped, e.g. when passing a knot or snag through the cord passage 12 in the manner described, since the accumulated heat in the walls of the chamber 1 would then burn or scorch the rubber. When the arm 5 is disengaged and the winding machine 23 stopped for any length of time it is advisable to break the normal feed of rubber to the extruder and to take the extruded rubber from the outlet orifice 3 and guide it over pulleys back to the feed side of the chamber 1, whence it can be re-extruded. The normal feed can be re-commenced when the winding machine 23 is restarted.

Preferably a knot or snag detector 24 is positioned between the unwinding bobbin 28 and the extruder. This may comprise two plates 25 lightly spring-loaded together and grooved on their adjacent faces to just accommodate the cord. The groove is tapered outwardly, i.e. chamfered, at the entry end. The two plates are associated with a sensitive micro-switch 27 which is wired into the main winding machine drive circuit 35 (Fig. 4), so that if a knot or snag 36 in the cord 33 forces the two plates 25 apart this trips the switch 27 and so stops the winding motor 30 and clutch motor 31. The knot or snag can then be moved manually past the extruder.

Preferably the rubber extruder is provided with an electro-magnet 19 located in an aperture 20 at the upper end of the bracket 4. This electro-magnet 19 is disposed so that when the arm 5 is swung upwardly to close the cord passage 12, the boss 15 abuts the armature 21 of the electro-magnet, as shown in Fig. 1, and is held in this position by the said magnet. The magnet 19 is wired into the electric circuit 35 of the main drive (Fig. 4), and a switch may also be wired into the circuit and disposed so as to be closed when the arm 5 is swung up into its operating position.

In this arrangement operational positioning of the arm 5 completes the circuit and sets in motion the winding machine 23. The electro-magnet 19 is also energized to hold the arm 5 in position and when so held the normal clamping arrangement may be released. A knot or snag 36 in the cord 30 operates the knot detector 24 to trip the micro-switch 27 and break the circuit. This automatically stops the winding motor 30 and clutch motor 31 and also de-energizes the electro-magnet 19, whereupon the arm 5 pivots downwardly to its disengaged position. The operator then manually draws the cord through the cord passage 12. Thereafter the arm 5 is swung upwardly to engaged position, clamped home against the force of the extruding rubber and, on the circuit being once more completed by the switch 29 at one end of the arm 5 and the magnet 19 energized, is unclamped again.

Preferably a manually operated over-ride switch 32 is incorporated in the circuit.

While the apparatus has been described particularly with regard to the production of tires, it can be used generally for coating wire or threads with rubber, polyvinyl chloride or other suitable thermoplastic material.

Having described my invention, what I claim is:

1. Apparatus to extrude rubber or other thermoplastic material evenly around a cord or the like, comprising an extrusion chamber having a delivery orifice, means to extrude the thermoplastic material through said orifice, an arm pivoted to swing toward said orifice, two separable members associated with said arm and having complementary channels to form in combination a passage for said cord transverse to said orifice, one of said members having a conduit communicating at one end with said cord passage and at its other end with the extrusion chamber orifice, retaining means to retain the arm in a position where said members are held tightly between the arm and said end of the chamber and means operable by a knot or snag-sensing device to release said retaining means and allow said members to move away from said end of the chamber.

2. Apparatus according to claim 1 wherein, upon release of said retaining means, said arm is adapted to move angularly under its own weight to enable said cord to be inserted in or removed from said passage.

3. Apparatus according to claim 1 wherein said two members are pivotally connected at one end and are formed with co-operating transverse grooves adapted to form said cord passage.

4. Apparatus according to claim 1 wherein an electro-magnet is operable to hold said arm in operative position when the clamping means are removed.

5. Apparatus according to claim 4 including a knot or snag sensing device operable by a knot or snag in said cord to break the electrical circuit to said electro-magnet and allow the arm to swing to non-operative position.

6. Apparatus according to claim 1 comprising a cammed lever pivotable into clamping engagement with an end of said arm.

7. Apparatus according to claim 1 wherein said retaining means comprise an electro-magnet.

8. Apparatus according to claim 7 wherein said knot or snag-sensing device comprises a pair of plates normally spring-urged together and into light rubbing contact with said cord, an electric switch associated with one of said plates and an electric conduit leading from a source of potential through said switch to said electro-magnet, whereby a knot or snag in said cord is operable to separate said plates and open said electric switch to de-energize said electro-magnet and release said arm.

9. Apparatus according to claim 8 comprising means to operate said extrusion apparatus continuously when said electro-magnet is de-energized.

10. Apparatus to extrude plastics such as rubber evenly around a cord comprising an extrusion chamber having a delivery orifice and means to extrude the plastic material through said orifice, an arm pivoted to swing toward said orifice, a member associated with said arm and adapted, upon swinging of said arm towards said orifice, to co-operate with said orifice to form an extrusion passage, transverse to said orifice through which said cord is adapted to be passed, electro-magnetic means operable to retain said member in co-operation with said orifice and knot or snag-sensing means operable by a knot or snag in said cord to de-energize said electro-magnet and permit said arm to swing away from said orifice.

11. Apparatus according to claim 10 comprising an electric switch associated with said arm whereby said electro-magnet is adapted to be energized upon swinging of said arm towards said orifice.

12. Apparatus to extrude rubber or other thermoplastic material evenly around a cord or the like, comprising an extrusion chamber having a delivery orifice, means to extrude the thermoplastic material through said orifice, an arm pivoted to swing toward said orifice, two members mounted on said arm, one in fixed position thereon and the other hinged to said fixed member to swing away from said fixed member when said arm is swung away from said orifice and to swing to said fixed member when said arm is swung to said orifice and having complementary channels to form in combination a passage for said cord transverse to said orifice, when said hinged member is swung to closed position relative to said fixed member and said arm is swung to said orifice, said hinged member having a conduit communicating at one end with said cord passage and at its other end with the extrusion chamber orifice, retaining means to retain the arm in a position where said members are held tightly between the arm and said end of the chamber and means to release said arm from said position.

13. Apparatus according to claim 12 wherein said arm retaining means comprises a cammed lever pivotable into clamping engagement with an end of said arm.

14. Apparatus according to claim 12 wherein said retaining means comprises an electromagnet.

15. Apparatus according to claim 12 wherein upon release of said retaining means said arm moves angularly under its own weight to enable a cord to be inserted in or removed from said passage.

16. Apparatus to extrude plastics such as rubber continuously around a cord which comprises an extrusion chamber having a delivery orifice and means to extrude the plastic through said orifice, an arm pivoted to swing to and from said orifice, a pair of separable members carried on said arm in such position that the first of said members will contact said orifice and the second of said members will have a face-to-face contact with said first member when said arm is swung to said orifice and which will separate from said orifice and from each other when said arm is swung from said orifice, the first of said members having a passage coinciding with said orifice when said arm is swung to said orifice, each of said members having a groove intersecting said passage to form an extrusion passage transverse to said orifice when said arm is swung to said orifice, an electromagnetic means to hold said arm to said orifice and to release said arm to permit said arm to fall from said orifice when said electromagnet is de-energized thereby permitting said members to separate and expose said grooves.

References Cited in the file of this patent

UNITED STATES PATENTS

| | | |
|---|---|---|
| 140,287 | Maertens | June 24, 1873 |
| 1,491,172 | Schutz | Apr. 22, 1924 |
| 1,763,136 | Crowley et al. | June 10, 1930 |
| 1,769,268 | Moyer | July 1, 1930 |
| 2,035,247 | Royle | Mar. 24, 1936 |
| 2,412,580 | Horman | Dec. 17, 1946 |
| 2,530,262 | Nelson | Nov. 14, 1950 |